July 25, 1939.　　　M. M. WEISS ET AL　　　2,167,256
AUTOMATIC NOSE-DIVE RECTIFYING DEVICE FOR AIRPLANES
Filed Aug. 23, 1938
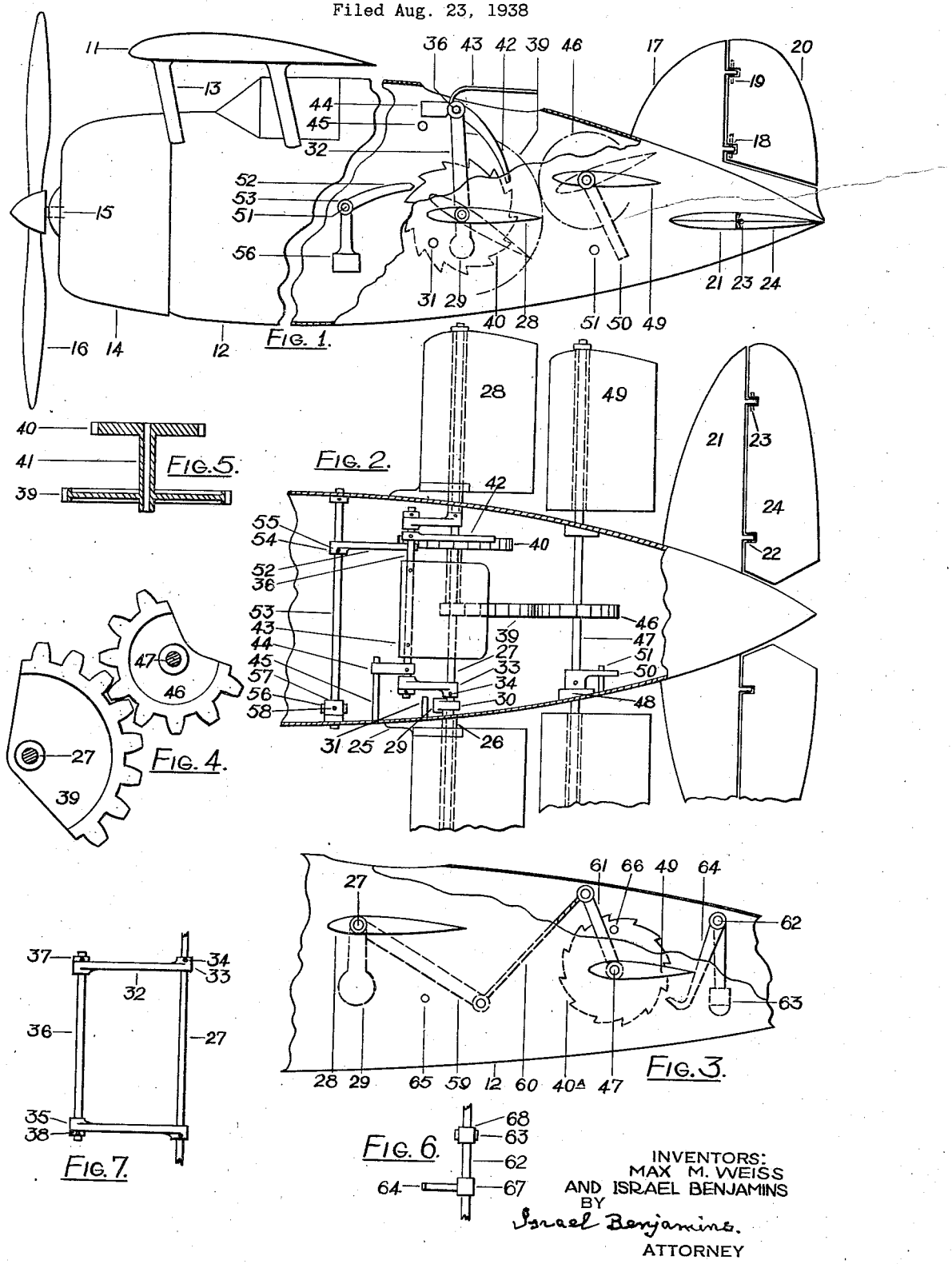
INVENTORS:
MAX M. WEISS
AND ISRAEL BENJAMINS
BY
*Israel Benjamins*
ATTORNEY Patented July 25, 1939

2,167,256

UNITED STATES PATENT OFFICE 2,167,256

AUTOMATIC NOSE-DIVE RECTIFYING DEVICE FOR AIRPLANES

Max M. Weiss and Israel Benjamins, Brooklyn, N. Y.

Application August 23, 1938, Serial No. 226,240

12 Claims. (Cl. 244—76)

This invention relates to improvements in automatic nose-dive rectifying devices for airplanes, and it consists in the novel features which are hereinafter described.

One of the objects of the invention is to provide an airplane with an automatically controlled elevator which may be elevators, independent and separate from the manually actuated elevators under the control of the pilot.

Another object is to have the said automatically controlled elevator actuated by the headwind in conjunction with sundry automatic devices, which are hereinafter described, whereby the following steps or operations should automatically be performed by it:

First: To stop the nose-down rotation of the airplane which noses down; second: To oppose the nose-down descent of the airplane in a straight line after its nose-down rotation has been stopped; third: To impart a nose-up rotation to the airplane, after opposing a nose-down descent of the airplane; and fourth: To discontinue the nose-up rotation of the airplane after the latter has been brought to a substantially level keel or to a desired degree of inclination thereto in either direction.

A still other object is to have the said nose-dive rectifying device reliable, quickly responsive and prompt in its action.

A further object of the invention is to have the said automatic nose-dive rectifying device simple, compact, durable and relatively inexpensive.

Other objects and advantages will hereinafter appear.

We attain these objects by the mechanism which is illustrated in the accompanying drawing or by any mechanical equivalent or obvious modification of the same.

In the drawing Fig. 1 is a fragmentary side view in elevation of an airplane provided with our nose-dive rectifying device showing the arms 32, which are hereinafter described, in acting position.

Fig. 2 is a fragmentary plan view of the same showing the said arms 32 in an inactive position.

Fig. 3 is a fragmentary side view in elevation of a part of the said airplane showing a modification of our nose-dive rectifying device.

Fig. 4 is a detail view in elevation, drawn to a larger scale of a pair of gear sectors forming part of our device as shown in Fig. 1.

Fig. 5 is a detail view in section on the line 5—5 of Fig. 4 showing a combined spur gear and ratchet wheel forming part of the mechanism shown in Fig. 1.

Fig. 6 is a detail view in end elevation of a gravity actuated pawl which is shown in Fig. 3, and Fig. 7 is a detail view in end elevation of the planetary spindle which is hereinafter described and its connections to the shaft of the pilot plates which are hereinafter described.

Like numerals refer to like parts throughout the several views of the drawing.

11 designates the wing member or plane of an airplane provided with our nose-dive rectifying device, and 12 the fuselage thereof, which is shown in Figs. 1 and 3 as having part of the sidewall thereof removed to more clearly show the parts of the nose-dive rectifying mechanism enclosed therein.

The wing 11 is shown as connected to the fuselage 12 by means of struts or inclines 13, which are of standard construction.

The engine of the airplane is enclosed by a cowl 14 and has thereon a shaft 15 to which a propeller 16 is connected.

The upper part of the rear end of the fuselage 12 is provided with a vertical fin 17 which has rotatably connected thereto by means of bearings 18 and pins 19 a vertically disposed rudder 20.

The sidewalls at the rear end of the fuselage are provided with stabilizer 21 which has rotatably connected thereto by means of bearings 22 and pins 23 and an elevator 24 which is secured to the latter, to be manually steered by the pilot by means of cables and a control stick, as is well known in the art.

The steering cables of the rudder and manually controlled elevator as well as the control pedals and stick are not shown in the drawing.

A pair of bearing plates 25 are shown in Fig. 2, exteriorly of the sides of the fuselage, and may be connected to the sides of the fuselage in any suitable manner.

The plates 25 terminate in bearings 26 for rotatably supporting therein a shaft 27 which has secured thereto an air reacting member or pilot member which is shown as comprising a pair of pilot plates 28 and a balancing member 29 for normally keeping the plates 28 substantially horizontal. The member 29 may be adjustably secured to the shaft 27 by means of a hub 30 and suitable set-screws which are not shown in the drawings.

A stop 31 is shown as extending from the side of the fuselage into a position to intercept the member 29 after the plates 28 have been deflected to their position which is shown in dotted lines in Fig. 1, thereby limiting the deflection of the plates 28.

A pair of arms 32 are shown as adjustably secured to the shaft 27 by means of hubs 33 and set screws 34 as shown in Fig. 7. The arms 32 terminate in bearings 35 which are pivotably supporting therein a planetary spindle 36, which is held against endwise displacement by means of collars 37 and set screws 38, as shown in Fig. 7.

The shaft 27 has swivelled thereon, interiorly of the fuselage 12, a rotary member comprising a gear sector 39, a ratchet 40 and a hub 41 which is integral with both the sector 39 and the ratchet 40, as shown in Fig. 5; the sector 39 is shown by its pitch circle in Fig. 1 and to a larger scale in Fig. 4.

A pawl 42 is adjustably mounted on the spindle 36 by means of a hub on the pawl 42 and suitable set screws which are not shown in the drawing. The pawl 42 is normally out of engagement with the ratchet 40; and is to be brought into engagement therewith by means of a wing member 43, which is also adjustably mounted on the said spindle 36 by means of a hub on said wing member 43 and suitable set-screws which are not shown in the drawing.

The member 43 is to be actuated by the relatively inclined headwind when the airplane takes a nose dive as is hereinafter more fully described; the wing member 43 is turned by the headwind clockwise in Fig. 1, and it turns the spindle 36 in the same direction, thereby bringing the pawl 42 into engagement with the ratchet 40, and thereby connecting the gear sector 39 to the shaft 27, which is turned by the plates 28 clockwise in Fig. 1 when the said plates 28 are actuated by the same relatively inclined headwind when the airplane noses down.

When the action of the headwind on the wing member 43 is discontinued, the spindle 36 is returned to its original position by means of a gravity member 44 which is shown in Figs. 1 and 2 as mounted on said spindle 36; the gravity member 44 is adjustably secured to the spindle 36 by means of a hub on said member 44 and suitable set-screws which are not shown in the drawing.

The gravity member 44 turns the spindle 36 counterclockwise in Fig. 1, thereby bringing the pawl 42 out of engagement with the ratchet 40.

The motion of the gravity member 44 is limited by a stop bar 45 which is shown in Figs. 1 and 2 as intercepting the gravity member 44.

The gear sector 39 is in mesh with a gear sector 46 which is secured to a shaft 47 which is rotatably supported by bearings 48 interiorly of the fuselage 12.

The gear sector 46 is shown by its pitch circle in Fig. 1 and to a larger scale in Fig. 4.

The shaft 47 has secured thereto exteriorly of the fuselage 12 an elevator, which is shown as comprising a pair of plates 49, and is designed to be automatically controlled, as is hereinafter more fully described.

When acted on by the gear sector 39, as above described, the gear sector 46 turns the shaft 47 with the elevator 49 thereon into the raised position shown by dotted lines in Fig. 1, whereupon the rotation of the shaft 27 is stopped through the interception by the stop 31 of the gravity member 29 on the shaft 27.

In its raised position the aerofoil or elevator 49 intercepts the headwind and the action of the latter in turn causes the elevator 49 to bear down on the tail end of the airplane, thereby raising the nose of the airplane.

To normally keep the elevator 49 in position, the shaft 47 has adjustably secured thereto an arm 50 by means of a hub on the arm 50 and suitable set screws, which are not shown in the drawing; the arm 50 is to be intercepted by a stop pin 51 which is secured to the fuselage 12, thereby limiting the rotation of the elevator 49 in a clockwise direction in Fig. 1, and thereby normally keeping the elevator 49 substantially horizontal.

The hereindescribed nose-dive rectifying device includes a means to retain the elevator 49 in the position shown in dotted lines in Fig. 1 after the airplane noses down, thereby, not only to check the nose down rotation of the airplane, but also to oppose a nose down descent of the airplane after its nose down rotation has been checked and to induce a nose up rotation of the airplane, whereby to bring the latter to a level keel: in the said retaining means a pawl 52 is provided on a spindle 53 which is pivotally connected to the fuselage 12, and to which the pawl 52 is adjustably secured by means of a hub 54 on the pawl 52 and set screws 55, one of which is shown in Fig. 2 of the drawing. The pawl 52 is to be brought into engagement with the ratchet 40 when the airplane noses down.

The spindle 53 has also adjustably secured thereto a gravity member 56 by means of a hub 57 on the member 56 and set screws 58.

The pawl 52 is normally out of engagement with the ratchet 40 when the airplane is either level or is climbing; but when the airplane noses down, the gravity member 56 turns the spindle 53 in a clockwise direction in Fig. 1, thereby bringing the pawl 52 into engagement with the ratchet 40 and thereupon keeps the pawl 52 in engagement with the ratchet 40 until the airplane is returned to a level keel, whereupon the gravity member 56 turns the spindle 53 in a counterclockwise direction in Fig. 1, thereby disengaging the pawl 52 from the ratchet 40.

It is evident that when the ratchet 40 is engaged by the pawl 52, as above described, the gears 39 and 46 are kept stationary with relation to the fuselage, thereby locking the shaft 47 with the elevator plates 49 thereon in the raised position as shown in dotted lines in Fig. 1.

When the pawl 52 is disengaged from the ratchet 40, the gears 39 and 46 are released, thereby also releasing the shaft 47 with the elevator plates 49 thereon, whereupon the latter are brought by the headwind to their position as shown in full lines in Fig. 1.

When an airplane begins to nose down and at the beginning of the nose down rotation thereof, the rear end of the airplane is moving substantially horizontally forward for a short interval of time while the leading end of the airplane is moving in a direction at an angle to the horizontal downwardly and forwardly.

The instantaneous center of rotation of the airplane at the beginning of the nose down is located at a distance below the rear end of the airplane in a line which is at right angles to the direction of motion of the rear part of the airplane at that instant.

When the airplane noses down, the nose down rotation of the airplane is therefore accompanied by an inclined and rearwardly direction of the headwind with relation to the rear end of the airplane which headwind presses against the upper side of the rear end of the airplane, whereby the pilot plates 28 on the shaft 27 are deflected and cause the shaft 27 to rotate in a clockwise direction in Fig. 1, and whereby simultaneously the wing member 43 causes the pawl 42 to engage the ratchet 40, thereby causing the latter with the gear 39 to rotate with said shaft 27, thereby turning the gear 46 in a counter-clockwise direction in Fig. 1, and thereby raising the elevator plates 49; the latter are then locked in a raised position by the pawl 52 and the gravity member 56, until the airplane is returned to a level keel by the action of the raised elevator plates 49, which first check the nose down rotation of the airplane, then oppose a nose down descent of the airplane and lastly, induce a nose up rotation of the airplane, whereby the latter is automatically returned to a level keel..

The action of the elevator 49 when raised is similar to that of the manually operated elevator 24 when the latter is raised and kept raised by the pilot.

The elevator plates 49 are thereupon automatically released from their raised position, thereby discontinuing the nose up rotation of the airplane which then continues on its level course, unless compelled by the pilot by means of the elevator 24 to depart from its level course.

During the nose down descent of the airplane the direction of the headwind is in line with the axis of the airplane engine shaft; and during the nose up rotation of the airplane the relative direction of the headwind is inclined towards the underside of the rear end of the airplane and rearwardly with relation to the said axis; but this last inclination to the said axis is at a smaller angle than that of the elevator plates 49 in their locked position.

The above described direction of the headwind in line with the axis of the propeller shaft and the following inclination of the headwind towards the underside of the rear end of the airplane will turn the pilot plates 28 in a counterclockwise direction in Fig. 1, thereby retracting the plates 28 and thereby avoiding to give any opposition to the rectification of the airplane from its nose dive.

After the return of the airplane to a level keel, the plates 28, if inclined upwardly, will be returned by the level headwind to their original position without any interference on the part of the pawl 42 and without in any way affecting the position of the elevator 49.

It is evident, therefore, that by the above mechanism, the nose dive of an airplane will be rectified entirely automatically from the beginning of the nose dive to the end thereof, without any attention on the part of the pilot, and leaving the airplane with the above described mechanism thereon in the same normal condition as it was before the nose dive took place, and as if the latter had never happened.

The provision for the adjustment of the positions of the various hereinbefore described parts which are mounted on spindles serves not only to determine experimentally the best possible location of these parts, but makes it possible to pre-determine the conditions for the operation of the nose dive rectifying device and to vary these conditions at will; for example: instead of rectifying a nose dive as soon as it happens, a certain amount of delay may be allowed, or the action may be hastened, if desired; similarly, the release of the airplane from the action of the above rectifying device may be either hastened or delayed by some of the said adjustments, which may be effected on the ground before the airplane takes off.

It will be understood that the dimensions and relative proportions of parts are not absolute; but are given only by way of an illustration.

In the modification shown in Figs. 3 and 6 the shaft 27 has thereon an arm 59 which is adjustably secured thereto by means of a suitable hub; the outer end of the arm 59 has connected thereto one end of a cable 60, the other end of which is secured to the outer end of an arm 61 on the shaft 47, to which the arm 61 is adjustably secured by means of a suitable hub thereon.

The shaft 47 has also secured thereto a ratchet 40a, to be engaged by a pawl 64 when the airplane noses down; the pawl 64 is adjustably secured by means of a hub 67 thereon to a spindle 62, and is normally out of engagement with the ratchet 40a, and is to be brought into engagement therewith when the airplane noses down, by means of a gravity member 63, which is also adjustably secured to the spindle 62 by means of a hub 68 thereon.

A stop 66 on the fuselage 12 is disposed to intercept the arm 61 on the shaft 47, thereby keeping the elevator 49 normally horizontal.

Another stop 65 on the fuselage 12 is disposed to intercept the arm 59 after the plates 28 have been deflected through a desired angle by the relatively inclined headwind when the airplane noses down.

The rotation of the plates 28 and arm 59 on the shaft 27 in a clockwise direction in Fig. 3 will by means of the cable 60 induce a rotation, in a counterclockwise direction in Fig. 3, of the arm 61 and shaft 47 with the elevator 49 thereon; this last mentioned rotation will be limited by the position of the stop 65; the elevator 49 will then be locked in position by the action of the pawl 64 on the ratchet 40a, until the airplane will be returned to a level keel after its nose dive has been rectified by the reaction of the elevator 49 to the headwind, the same as in the modification hereinbefore described and shown in Figs. 1 and 2.

The flexibility of the cable 60 will permit the plates 28 to be retracted by the headwind during the time of the nose down descent and nose up rotation of the airplane when the elevator 49 will be locked to the fuselage by means of the pawl 64 as above described.

When the airplane is returned to a level keel or to any predetermined position near a level keel, the ratchet 40a will be released by the pawl 64 and the elevator 49 will then be returned by the headwind to the position shown in Fig. 3.

Other variations are possible, and parts of our invention may be used without other parts.

We do not, therefore, restrict ourselves to the details as shown in the drawing.

Wherever in the claims hereinafter the term "aerofoil" occurs, it is meant to denote an air deflecting member of any shape.

We claim as our invention and desire to secure by Letters Patent:

1. In a nose dive rectifying device for airplanes, an aerofoil adapted to act as an elevator, pivotally mounted near the tail end of the airplane body, an air reacting member, subject to the airflow in a relatively inclined direction to the said body, movably mounted on said body, means for operatively interconnecting said member and said aerofoil, so constructed and arranged that a relatively downwardly inclined airflow on the said member caused by a nose down rotation of the airplane will incline said aerofoil upwardly and rearwardly, and gravity controlled means for holding the said aerofoil in said position after the said nose down rotation of the airplane has been checked, until the airplane is returned to a substantially level keel, said holding means being adapted automatically to release the aerofoil when the said aeroplane has been returned to the said position at or near its level keel.

2. In a nose dive rectifying device for airplanes, an aerofoil adapted to act as an elevator, pivotally mounted near the tail end of the airplane body, an air reacting member, subject to the airflow in a relatively inclined direction to the said body, pivoted on said body, and means operatively interconnecting said member and said aerofoil, so constructed and arranged that a relatively downwardly inclined airflow on the said member, caused by a nose-down rotation of the airplane, will incline said aerofoil upwardly and rearwardly, and a gravity controlled means for automatically locking said aerofoil in the said position on the airplane and to keep the aerofoil in the said position after the nose down rotation of the airplane has been checked, and thereupon to impart a nose up rotation to the airplane whereby to bring the latter to a substantially level keel position, said locking means being adapted automatically to release said aerofoil when said airplane has been returned to the said position at or near its level keel.

3. The elements of claim 2, combined with a means for operatively disconnecting the said member from the said aerofoil after the nose-down rotation of the airplane has been checked and the relative direction of the headwind has thereby been changed, whereby said member may automatically be retracted by the changed relative direction of the headwind without interfering with the continued action of the said aerofoil.

4. The elements of claim 1, said holding means comprising a ratchet operatively connected to said aerofoil and a pawl which is pivotally connected to the airplane and normally out of engagement with said ratchet, combined with a gravity member connected to said pawl and adapted to bring it into engagement with said ratchet when the airplane noses down and to disengage said pawl from said ratchet when the airplane has been returned to a substantially level keel.

5. The elements of claim 2, combined with a shaft secured to said member for pivotally connecting said member to the airplane, a ratchet operatively connected to said aerofoil and swivelled on said shaft, a pawl pivotally connected to a part carried by said shaft and normally out of engagement with said ratchet, a means for automatically bringing said pawl into engagement with said ratchet during the nose down rotation of the airplane, thereby operatively connecting said member to said aerofoil, and a means for automatically bringing said pawl out of engagement with said ratchet when the nose down rotation of the airplane has been checked, thereby operatively disconnecting said member from said aerofoil.

6. The elements of claim 2, combined with a shaft secured to said member for pivotally connecting said member to the airplane, a ratchet operatively connected to said aerofoil and swivelled on said shaft, a pawl pivotally connected to a part carried by the said shaft and normally out of engagement with said ratchet, a wing member connected to said pawl and disposed to be actuated by the relative headwind during the nose down rotation of the airplane, whereby automatically to bring the said pawl into engagement with said ratchet, thereby operatively connecting the said air reacting member to the said aerofoil, and a means for automatically bringing said pawl out of engagement with said ratchet when the nose down rotation of the airplane has been checked, thereby operatively disconnecting said air reacting member from said aerofoil.

7. The elements of claim 2, said member being pivotally connected to said airplane, and normally out of operative connection with said aerofoil, combined with a shaft secured to said member for pivotally connecting said member to the airplane, a ratchet, operatively connected to said aerofoil and swivelled on said shaft, a pawl pivotally connected to a part carried by the said shaft and normally out of engagement with said ratchet, a wing member, connected to said pawl, and disposed to be actuated by the relative headwind during the nosedown rotation of the airplane, whereby automatically to bring said pawl into engagement with said ratchet, thereby operatively connecting said air reacting member to said aerofoil, and a gravity member connected to said pawl and disposed automatically to bring said pawl out of engagement with said ratchet when the nose down rotation of the airplane has been checked, thereby operatively disconnecting said air reacting member from said aerofoil.

8. The elements of claim 2, said member being pivotally connected to said airplane and normally out of operative connection with said aerofoil, combined with a shaft secured to said member for pivotally connecting said member to the aeroplane, a ratchet operatively connected to said aerofoil and swivelled on said shaft, a planetary spindle, pivotally connected to a part carried by said shaft, a pawl adjustably secured to said spindle and normally out of engagement with said ratchet, a wing member adjustably secured to said spindle and disposed to be actuated by the relative headwind during the nose down rotation of the airplane, in a way automatically to turn said spindle in a direction whereby to bring said pawl into engagement with said ratchet, thereby operatively connecting said air reacting member to said aerofoil, and a gravity member, adjustably secured to said spindle and disposed automatically to turn the said spindle in the opposite direction, whereby to bring the said pawl out of engagement with said ratchet when the nose down rotation of the airplane has been checked, thereby operatively disconnecting said air reacting member from said aerofoil.

9. The elements of claim 2, combined with a shaft for connecting said aerofoil to the airplane, another shaft for connecting said member to the airplane, a gear secured to the aerofoil shaft, another gear swivelled on said other shaft, a ratchet connected to said other gear to be turned therewith as a unit, a pawl pivotally connected to a part carried by the said other shaft and normally out of engagement with said ratchet, a means for automatically bringing said pawl into engagement with said ratchet during the nose down rotation of the airplane, thereby operatively connecting said member to said aerofoil, and a means for automatically bringing said pawl out of engagement with said ratchet when the nose down rotation of the airplane has been checked, thereby operatively disconnecting said member from said aerofoil.

10. The elements of claim 2, combined with a shaft for pivotally connecting the said air reacting member to the airplane, an arm on said shaft, a flexible transmission member, connected at one end thereof to said arm, another shaft for pivotally connecting the said aerofoil to the airplane, and another arm on the said other shaft, said arms extending in substantially opposite directions, the other end of said flexible member being connected to said other arm in a way to rotate said other arm with said other shaft in a contrary direction with relation to the direction of rotation of said first mentioned arm and shaft, the flexibility of said transmission member allowing the said air reacting member to be retracted by the changed direction of the headwind after the said nose down rotation of the airplane has been checked.

11. The elements of claim 2, combined with a shaft for pivotally connecting the said air reacting member to the airplane, an arm on said shaft, another shaft for pivotally connecting the said aerofoil to the airplane, an arm on each of the said shafts, said arms extending in substantially opposite directions, and a transmission member connecting the ends of the said arms in a way to allow a variable distance between the ends of the said arms, said transmission member to transmit motion from the said first mentioned shaft to the said other shaft at full length of the said transmission member, when the said air reacting member is turned in one direction, thereby turning said other shaft with the aerofoil thereon in the opposite direction with relation to said first mentioned shaft with said air reacting member thereon, and said transmission member being adapted to allow the said air reacting member to be retracted by the changed direction of the headwind when the said first mentioned shaft with the said air reacting member thereon is turned in a contrary direction.

12. The elements of claim 2, combined with a means for normally keeping the said member substantially horizontal.

MAX M. WEISS.
ISRAEL BENJAMINS.